United States Patent
Matsumoto et al.

(10) Patent No.: US 7,917,560 B2
(45) Date of Patent: Mar. 29, 2011

(54) RANDOM NUMBER TEST CIRCUIT

(75) Inventors: Mari Matsumoto, Yokohama (JP);
Tetsufumi Tanamoto, Yokohama (JP);
Shinobu Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1104 days.

(21) Appl. No.: 11/635,590

(22) Filed: Dec. 8, 2006

(65) Prior Publication Data

US 2007/0162806 A1 Jul. 12, 2007

(30) Foreign Application Priority Data

Dec. 13, 2005 (JP) .................................. 2005-359236

(51) Int. Cl.
*G06F 1/02* (2006.01)
(52) U.S. Cl. ........................................................ 708/250
(58) Field of Classification Search .................... 708/250
See application file for complete search history.

(56) References Cited

U.S. PATENT DOCUMENTS

| 4,071,903 | A | 1/1978 | Head et al. |
| 6,844,234 | B2 | 1/2005 | Eguchi et al. |
| 2003/0061250 | A1 | 3/2003 | Fujita et al. |
| 2003/0158875 | A1* | 8/2003 | Hars .............................. 708/250 |
| 2004/0061538 | A1 | 4/2004 | Yasuda et al. |
| 2005/0108308 | A1 | 5/2005 | Yasuda et al. |
| 2005/0204220 | A1 | 9/2005 | Yasuda et al. |

FOREIGN PATENT DOCUMENTS

| EP | 1 489 489 A1 | 12/2004 |
| GB | 2 144 044 A | 2/1985 |
| JP | 2003-196081 | 7/2003 |
| JP | 3487300 | 10/2003 |
| JP | 2004-310314 | 11/2004 |
| JP | 2005-518046 | 6/2005 |

OTHER PUBLICATIONS

Notification of Reasons for Rejection issued by the Japanese Patent Office on Feb. 20, 2009, for Japanese Patent Application No. 2005-359236, and English-language translation thereof.
Donald E. Knuth, "The Art of Computer Programming," Addison-Wesley (1998), title pages and pp. v-vii, xii, xiii, and 60-75.
Solomon W. Golomb, "Shift Register Sequences," Aegean Park Press (1982), title pages and pp. xiv-xvi and 24-27.

(Continued)

*Primary Examiner* — Chuong D Ngo
(74) *Attorney, Agent, or Firm* — Finnegan, Henderson, Farabow, Garrett & Dunner, L.L.P.

(57) ABSTRACT

The random number test circuit includes a shift register which operates based on a clock and which successively stores serial random numbers generated by a random number generation element, a first random number being output from a predetermined stage of the shift register; a comparison circuit which compares the first random number with a second random number located at a distance of a first predetermined number of bits from the first random number, the second random number being generated by the random number generation element; a counter which counts a frequency of occurrence of equality or inequality between the first random number and the second random number, with respect to all bits in the serial random numbers, and a decision circuit which judges an article quality to be good if a count value in the counter indicates a frequency of occurrence equal to or less than a number determined previously by correlation.

12 Claims, 9 Drawing Sheets

OTHER PUBLICATIONS

Decision of Final Rejection issued by the Japanese Patent Office on Jun. 30, 2009, for Japanese Patent Application No. 2005-359236, and English-language translation thereof.

European Search Report issued by the European Patent Office on Jul. 31, 2008, for European Patent Application No. 06 25 6186.

Menezes et al., Handbook of Applied Cryptography (Jan. 1, 1997), pp. 181-182.

Kazumasa Wakimoto, "Knowledge of Random Numbers," pp. 48-54, published in 1970.

* cited by examiner

RANDOM NUMBER TEST CIRCUIT

CROSS-REFERENCE TO RELATED APPLICATION

This application is based upon and claims the benefit of priority from prior Japanese Patent Application No. 2005-359236 filed on Dec. 13, 2005 in Japan, the entire contents of which are incorporated herein by reference.

BACKGROUND OF THE INVENTION

1. Field of the Invention

The present invention relates to a random number test circuit.

2. Related Art

Conventionally, there are statistical random number test methods. However, they need a large number of data (20000 bits or more). In addition, they need a large-scale program to implement test items. Therefore, the scale of the random number test circuit becomes large, and test is conducted in a factory at the time of shipping only once. In small-sized information terminals which frequently use random numbers, a small-sized and simple random number test circuit is needed.

On the other hand, there is a self-test random number generation circuit having a random number test circuit incorporated in a chip (see, for example, JP-A 2004-310314 (KOKAI)).

The random number test circuit described in JP-A 2004-310314 (KOKAI) adopts FIPS-140-2 as its test method. As shown in FIG. 10 of JP-A 2004-310314 (KOKAI), the random number test circuit includes a serial physical random number generator 201, a monobit test circuit 202, a poker test circuit 203, a runs test circuit 204 and a long runs test circuit 205 connected to an output of the serial physical random number generator 201 and obtained by implementing test methods of four kinds included in FIPS-140-2 as circuits, and a selector 206 which retains results of tests conducted by the monobit test circuit 202, the poker test circuit 203, the runs test circuit 204 and the long runs test circuit 205 and makes a synthetic decision.

First, serial random numbers output from the serial physical random number generator 201 are coupled to inputs of the monobit test circuit 202, the poker test circuit 203, the runs test circuit 204 and the long runs test circuit 205. Data of 20000 bits are needed for the test. Each of the monobit test circuit 202, the poker test circuit 203, the runs test circuit 204 and the long runs test circuit 205 includes a control circuit, a counter, a comparison circuit and a comparator. Results of tests respectively conducted by the monobit test circuit 202, the poker test circuit 203, the runs test circuit 204 and the long runs test circuit 205 are held in the selector 206. The synthetic decision is output when decision results are success in all of the test methods of the four kinds.

In the test according to the FIPS-140-2, however, the number of data required for the test is very large as many as 20000 bits. An enormous hold circuit is needed to hold the 20000-bit data. In addition, the test methods of four kinds are needed for each cycle of operation required for the test. Each test method requires 20000-bit data. This results in a problem that the circuit scale becomes very large.

The essence of the problem is that if a mathematical test method which is not restricted to the FIPS-140-2 is implemented as a circuit as it is, the area of the circuit becomes enormous. Therefore, it is demanded to reduce the area of the circuit remarkably in order to mount the random number test circuit on a small-sized circuit such as an IC card.

SUMMARY OF THE INVENTION

An object of the present invention is to provide a random number test circuit which does not increase in circuit scale even if it handles a large number of data required for test and which can be reduced in size.

A random number test circuit according to a first aspect of the present invention includes: a shift register which operates based on a clock and which successively stores serial random numbers generated by a random number generation element, a first random number being output from a predetermined stage of the shift register; a comparison circuit which compares the first random number with a second random number located at a distance of a first predetermined number of bits from the first random number, the second random number being generated by the random number generation element; a counter which counts a frequency of occurrence of equality between the first random number and the second random number, with respect to all bits in the serial random numbers; and a decision circuit which judges an article quality to be good if a count value in the counter indicates a frequency of occurrence equal to or less than a number determined previously based on correlation.

A random number test circuit according to a second aspect of the present invention includes: a shift register which operates based on a clock and which successively stores serial random numbers generated by a random number generation element, a first random number being output from a predetermined stage of the shift register; a comparison circuit which compares the first random number with a second random number located at a distance of a first predetermined number of bits from the first random number, the second random number being generated by the random number generation element; a counter which counts a frequency of occurrence of inequality between the first random number and the second random number, with respect to all bits in the serial random numbers; and a decision circuit which judges an article quality to be good if a count value in the counter indicates a frequency of occurrence equal to or less than a number determined previously by correlation.

A random number test circuit according to a third aspect of the present invention includes: a shift register which operates based on a clock and which successively stores serial random numbers generated by a random number generation element, a plurality of first random numbers being output from a plurality of predetermined stages of the shift register; a comparison circuit which compares the first random numbers with second random numbers respectively located at distances of predetermined number of bits from the first random numbers, the second random numbers being generated by the random number generation element; a counter which counts a frequency of occurrence of equality between each of the first random numbers and each of the second random numbers, for each of the first random numbers with respect to all bits in the serial random numbers; and a decision circuit which judges an article quality to be good if a count value in the counter for each of the first random numbers indicates a frequency of occurrence equal to or less than a number determined previously by correlation.

A random number test circuit according to a fourth aspect of the present invention includes: a shift register which operates based on a clock and which successively stores serial random numbers generated by a random number generation element, a plurality of first random numbers being output from a plurality of predetermined stages of the shift register; a comparison circuit which compares the first random numbers with second random numbers respectively located at distances of predetermined number of bits from the first random numbers, the second random numbers being generated by the random number generation element; a counter which counts a frequency of occurrence of inequality between each of the first random numbers and each of the second random numbers, for each of the first random numbers with respect to all bits in the serial random numbers; and a decision circuit which judges an article quality to be good if a count value in the counter for each of the first random numbers indicates a frequency of occurrence equal to or less than a number determined previously by correlation.

DETAILED DESCRIPTION OF THE INVENTION

Figure 1:
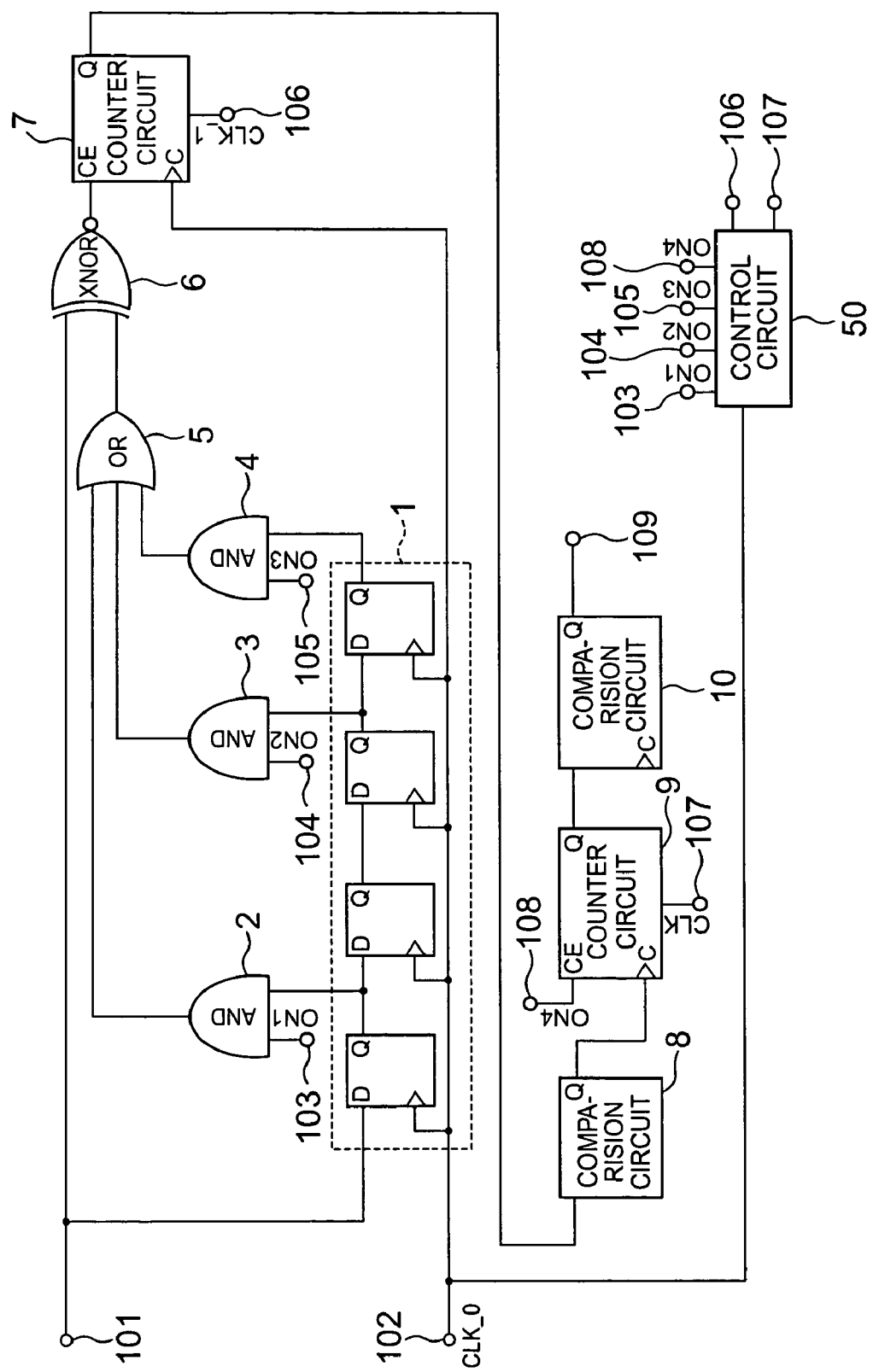
FIG. 1 is a diagram showing a random number test circuit according to a first embodiment of the present invention.

Prior to description of embodiments of the present invention, outline of the present invention will now be described.

First, a test method used in the embodiments and an idea directed toward the circuit scale reduction will now be described.

The random number test method used in the embodiments of the present invention uses the test condition defined by S. W. Golomb. The test condition includes three conditions. It is known that if the following condition concerning an auto-correlation function is satisfied two other conditions are satisfied (see Solomon W. Golomb, SHIFT REGISTER SEQUENCES). The condition concerning the auto-correlation function is that when the auto-correlation function C(t) is represented with respect to the total number n of random numbers, by the following expression, $$n*C(t) = \sum_{i=1}^{n}(2S_i - 1)*(2S_{i+1} - 1) = K \quad (1)$$

and K in the expression follows normal distribution, the random numbers are judged to be genuine random numbers. Here, $1 \leq t \leq n-1$. By the way, a symbol "*" indicates a multiplication symbol.

The expression (1) in the test method represents the sum total having a periodicity. For example, when the parameter of the series is n and t=1, "the sum total having a periodicity" means that the expression (1) is represented by the following expression.

$$n*C(1)=(2S_1-1)*(2S_2-1)+(2S_2-1)*(2S_3-1)+\ldots+(2S_n-1)*(2S_1-1) \quad (2)$$

When the process for finding n*C(1) in the expression (2) with respect to serial random numbers is implemented as a circuit, the sum total of products concerning two random numbers must be found. The two random numbers $S_i$ and $S_{i+t}$ are not only random numbers deviated by t in one direction, but also when one of the two random numbers is $S_n$ (where n is the total number of random numbers used for the test), the other of the two random numbers must return periodically to $S_1$. In order to find n*C(1) in the expression (2), therefore, at least data of $S_1$ must be held by using some method. As t becomes larger, the number of data which must be held increases. In addition, if the test is conducted with respect to a plurality of t's, it might become necessary to hold all random numbers required for the test.

When solving the expression (2), therefore, it is necessary to use shift registers having as many stages as the total number (for example, n) of random numbers to be tested in order to convert serial random numbers to parallel random numbers, n XNOR gates, n XOR gates, or n AND gates having a NOT input as one input in order to compare random numbers located at a distance corresponding to some number with values, and shift registers of n stages in order to convert n parallel random numbers output from the n gates to serial random numbers. As the total number of random numbers used for the test increases, therefore, the number of gates becomes enormous and the circuit scale expands. In addition, there is a drawback that a great part of the test circuit is occupied by a calculation part of n*C(t).

In the embodiments of the present invention, it is implemented to further reduce the size of the circuit by removing the process of the conversion of serial random numbers to parallel random numbers and its inverse conversion. In implementing this, it is supposed that "there is no great difference in the sum total of products of two random numbers $$\sum_{i=1}^{n}(2S_i - 1)*(2S_{i+t} - 1)$$

represented by the expression (1), in the case where there is no periodicity, the case where there is periodicity, i.e., the case where correlation is conducted periodically at a distance of t and the case where correlation is conducted at a distance of t unidirectionally." In the case where there is no periodicity, the expression (1) becomes as follows.

$$n*C(1)=(2S_1-1)*(2S_2-1)+(2S_2-1)*(2S_3-1)+\ldots+(2S_n-1)*(2S_{n+1}-1) \quad (3)$$

In addition, in an embodiment of the present invention, the decision criterion value of the random number test follows normal distribution. When a random number series having a total of n random numbers $S_1, S_2, \ldots, S_n$ is given, a correlation coefficient $r_{xy}^{(t)}$ in sets of numbers having a distance of t $(S_1, S_{1+t}), (S_2, S_{2+t}), \ldots, (S_n, S_t)$ is defined by the following expression.

$$r_{xy}^{(t)} = \frac{\frac{1}{n}\sum_{i=1}^{n} S_i \cdot S_{i+t} - \bar{S}^2}{\frac{1}{n}\sum_{i=1}^{n}(S_i - \bar{S})^2} \quad (4)$$

where $$\bar{S} = \frac{1}{n}\sum_{i=1}^{n} S_i \quad S_{n+t} = S_t$$

A method of testing whether there is regularity in the random number series according to whether the correlation coefficient is great is referred to as "sequence correlation test with a delay t," and it is conducted based on the way of thinking of the testing statistical hypothesis (see "Knowledge of random numbers" written by Kazumasa Wakimoto). In other words, when finding the value of $r_{xy}^{(t)}$ and making a decision whether there is regularity, the value of $r_{xy}^{(t)}$ assuring the irregularity of the random number series is ambiguous, and consequently the following test criterion is adopted in an embodiment of the present invention. This test criterion is applied to the auto-correlation function C(t) to adapt the method as a test method in the embodiment of the present invention.

As the test method according to the embodiment of the present invention, the distribution of the correlation coefficient $r_{xy}^{(t)}$ represented by a complicated expression is simplified by using Fisher's Z-transform. When the correlation coefficient $r_{xy}^{(t)}$ is transformed by the following expression $$Z = \frac{1}{2}\ln\frac{1+r_{xy}^{(t)}}{1-r_{xy}^{(t)}}$$

and in addition u is found by the relation $u=Z(N-3)^{1/2}$, u approximately follows normal distribution. The Fisher's Z-transform utilizes this fact. Here, the correlation coefficient $r_{xy}^{(t)}$ corresponds to the auto-correlation function C(t) in the expression (1), and details thereof will be described later. By utilizing this transform, the test criterion in the embodiment of the present invention is defined and a confidence interval is determined with reliability of the normal distribution set to 95%.

The relationship between the correlation coefficient $r_{xy}^{(t)}$ represented by the expression (4) and the auto-correlation function C(t) will now be described. The expression (1) can be expanded as follows:

$$n * C(t) = 4\sum_{i=1}^{n} S_i \cdot S_{i+1} - 4n\bar{S} + n \quad (5)$$

The first term in the right side of the expression (5)

$$\sum_{i=1}^{n} S_i \cdot S_{i+t}$$

is found and substituted into the expression (4) representing the correlation coefficient. As a result, the expression (4) can be represented by the following expression (6).

$$r_{xy}^{(t)} = \frac{\frac{1}{4}C(t) + \bar{S} - \frac{1}{4} - \bar{S}^2}{\bar{S} - \bar{S}^2} \quad (6)$$

In addition, a null hypothesis that "random numbers are arranged irregularly" is built up. Under this null hypothesis, it can be considered that the following relation holds true.

$$\bar{S} = \frac{1}{2}$$

Therefore, the relation between the correlation coefficient $r_{xy}^{(t)}$ and the auto-correlation function C(t) can be represented as follow:

$$r_{xy}^{(t)} = C(t)$$

As a result, the range of K in the expression (1) follows the following expression (7). The total number n of random numbers which are the subject of the decision is arbitrary.

$$n(\alpha - \delta) < K < n(\alpha + \delta) \quad (7)$$

Here, $$\alpha = -\frac{1}{n-1}, \delta = \frac{2}{n-1}\sqrt{\frac{n(n-3)}{n+1}}$$

Figure 8:
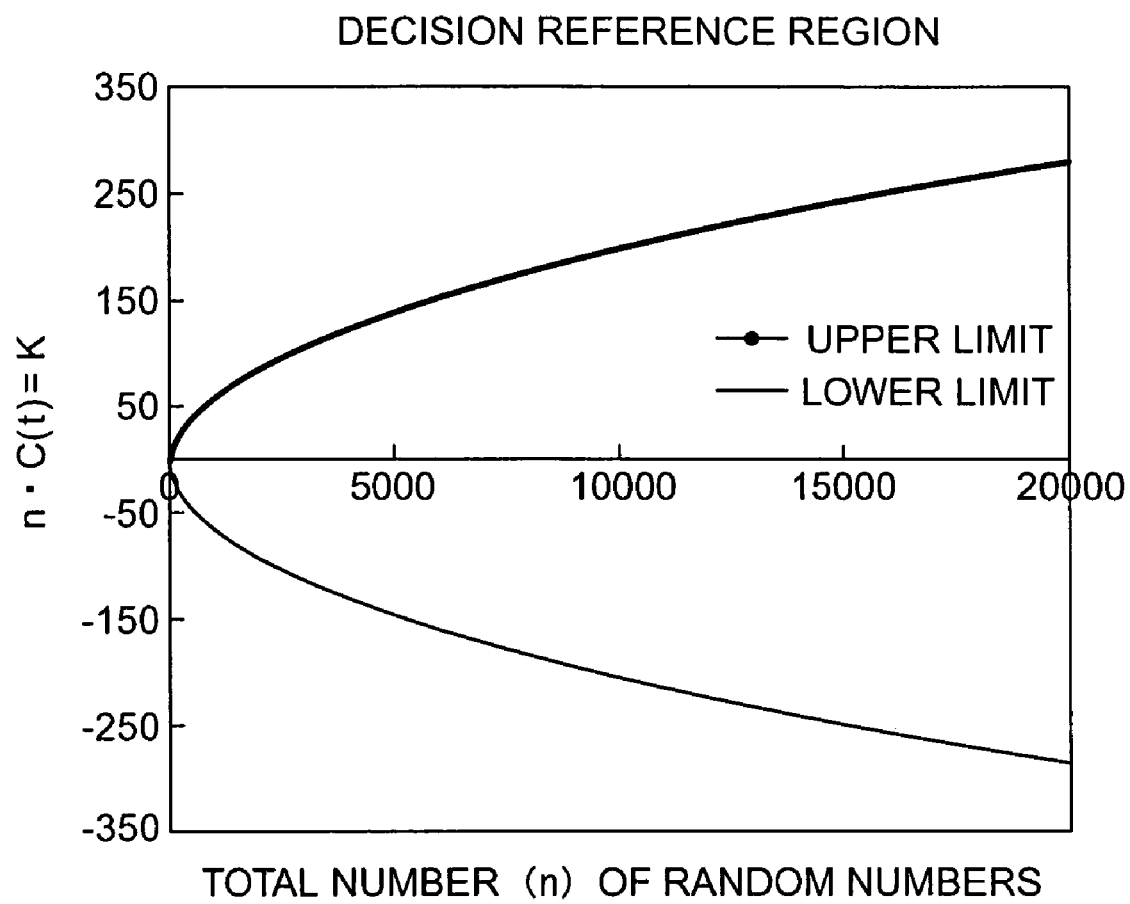
FIG. 8 is a diagram showing a test criterion region which follows normal distribution as an example concerning a random number test criterion.

In the embodiment of the present invention, the decision is made on the basis of this decision criterion. However, this is nothing but an example. It is also possible to make a decision by conducting replacement to another criterion value. The decision criterion represented by the expression (7) is shown in FIG. 8, where the abscissa indicates the total number n of random numbers and the ordinate indicates a product K of the auto-correlation function C(t) and the total number n of random numbers.

The test criterion value in the embodiment of the present invention is derived from the expression (7) as described hereafter. Denoting an occurrence frequency when a 1-bit random number $S_i$ included in a total of n random numbers is equal to a random number $S_{i+t}$ located at a distance of a certain number of bits t from the random number $S_i$ by x and an occurrence frequency when a 1-bit random number $S_i$ included in a total of n random numbers is different from a random number $S_{i+t}$ located at a distance of a certain number of bits t from the random number $S_i$ by y, the relation x+y=n holds true among x, y and n. In addition, the relation K=x−y holds true among x, y and K.

Therefore, the test criterion value in an embodiment of the present invention is rewritten by means of a range of x as represented by the following expression (8) on the basis of the expression (7).

$$\frac{n(\alpha - \delta + 1)}{2} < x < \frac{n(\alpha + \delta + 1)}{2} \quad (8)$$

Furthermore, the test criterion value in another embodiment of the present invention is rewritten by means of a range of y as represented by the following expression (9) on the basis of the expression (7).

$$\frac{n(1 - \alpha - \delta)}{2} < y < \frac{n(1 - \alpha + \delta)}{2} \quad (9)$$

As for the test criterion value in still another embodiment of the present invention, a 1-bit random number $S_i$ included in a total of n random numbers is different from a random number $S_{i+t}$ located at a distance of a certain number of bits t from the random number $S_i$ and it is predetermined which value of $S_i$ and $S_{i+t}$ is "1" or "0." Denoting an occurrence frequency counted at this time by z, the occurrence frequency z becomes half of the occurrence frequency y. As a result, the test criterion value for the occurrence frequency z becomes as represented by the following expression (10).

$$\frac{n(1 - \alpha - \delta)}{4} < z < \frac{n(1 - \alpha + \delta)}{4} \quad (10)$$

In order to confirm the reliability of the supposition that "there is no great difference between the sum total obtained when the method of finding correlation at a distance of t periodically is used and the sum total obtained when the method of finding correlation at a distance of t unidirectionally is used," tests are conducted actually by using both methods. As for random numbers used for the test, random number series of two kinds: a random number series which has passed a general test and a random number series which has failed the general test are prepared (see DONALD E. KNUTH, The Art of Computer Programming). The random number series of two kinds are evaluated by using a method of evaluating random numbers having a periodicity described in the above-described supposition and a method of evaluating random numbers which has no periodicity and which has a deviation only in one direction. If the random numbers which have passed the general test are judged to pass and the random numbers which have failed the general test are judged to fail, the decision method is judged to be reliable.

Figure 9A:
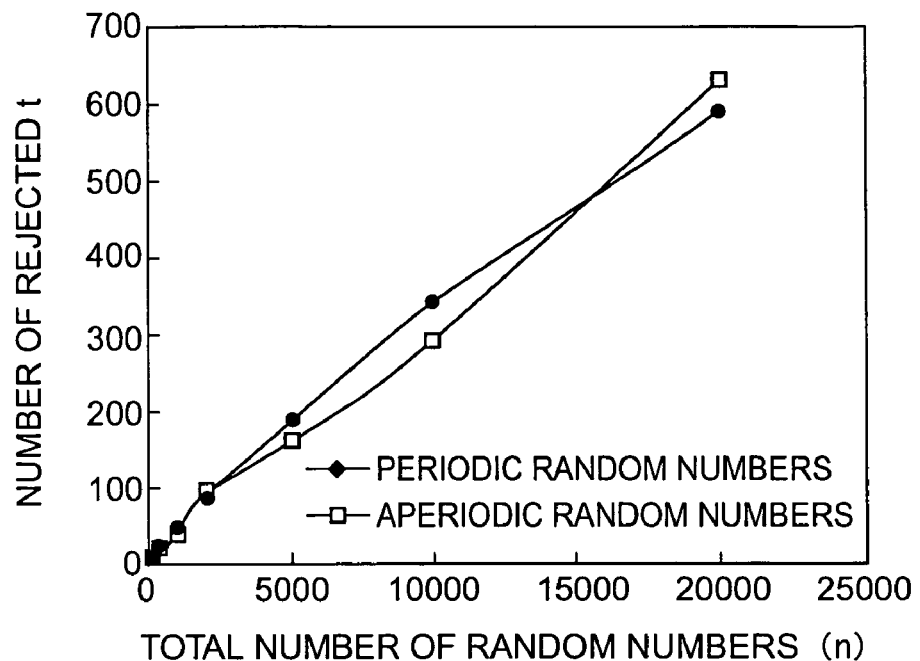
FIGS. 9A and 9B are diagrams for explaining relationship between the total number of random numbers and the number of rejected t when test is conducted by using two test methods: a periodic evaluation method and an aperiodic evaluation method.
Figure 9B:
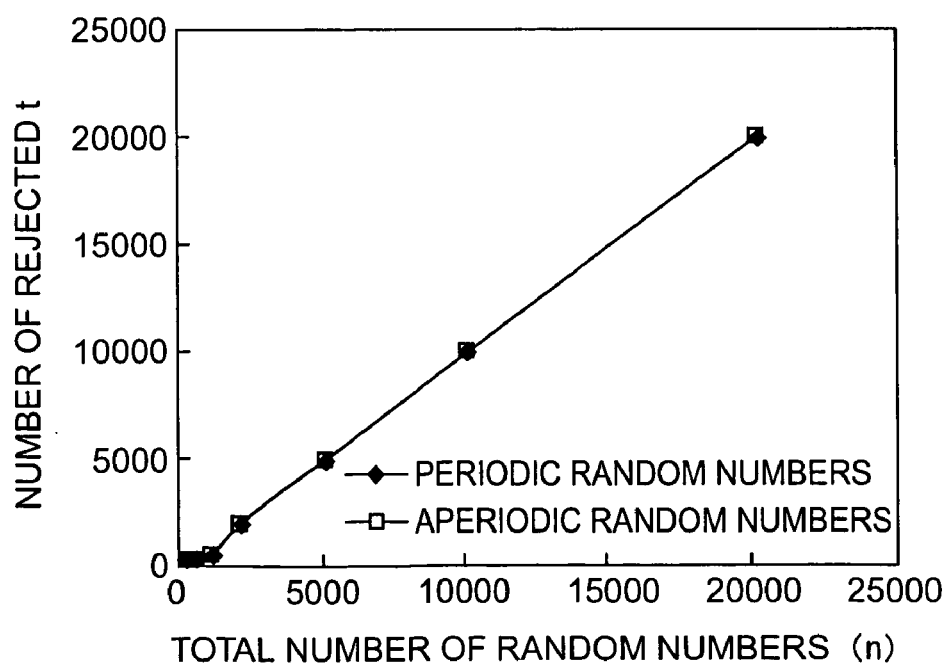
Figure 10:
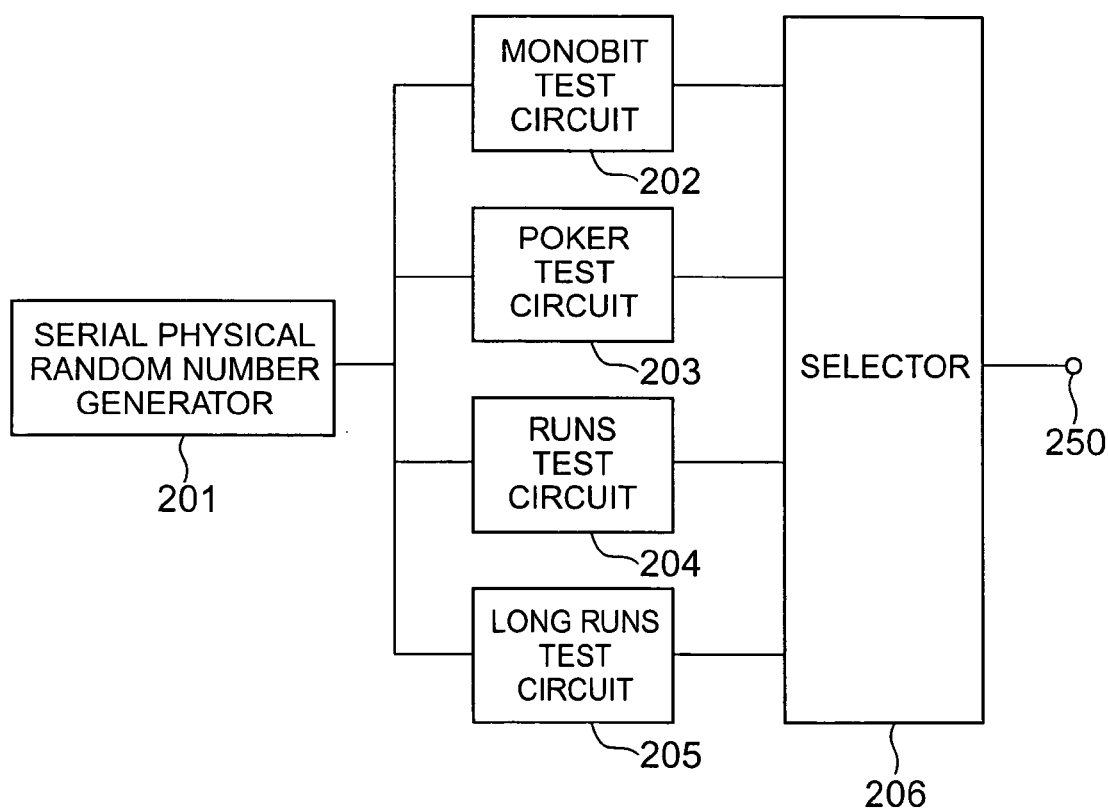
FIG. 10 is a diagram showing a conventional random number test circuit.

FIGS. 9A and 9B show plots of results of decision conducted by using the periodic evaluation method and the aperiodic evaluation method, where the ordinate indicates the total number of rejected test results and the abscissa indicates the total number n of random numbers. FIG. 9A shows results obtained by making a decision on the random number series which has passed the general test by using the periodic and aperiodic evaluation methods. FIG. 9B shows results obtained by making a decision on the random number series which has failed the general test by using the periodic and aperiodic evaluation methods.

When a decision is made on the random number series which has passed the general test and the random number series which has failed the general test by using the periodic evaluation method and the aperiodic evaluation method, a remarkable behavior difference which remarkably overturns the test results according to the test method is not noticeable in FIGS. 9A and 9B no matter which of the periodic and aperiodic test methods is used for the test in either case. Therefore, there is no need to reject the above-described supposition.

A test method in yet another embodiment of the present invention is based on relationship between a ratio of rejected test results to the total number in the test and the total number n of random numbers. In this test method, a distance (the number of bits) between a certain 1-bit random number included in a total of n random numbers and another 1-bit random number to be compared therewith is denoted by t. The above-described test using a correlation coefficient at each t is conducted. In a range of 0 to n−1, the probability that the total number P of t's which pass the test assumes each value is equal. As a result, the passing rate can be represented as P/(n−1). Therefore, the passing rate of the test follows the $\chi^2$-distribution.

For example, it is supposed that the range of 0 to 1 is divided into 25 sections and a criterion that the passing rate is 0.95 or more, i.e., t's of 95% or more pass the test is set. Letting the total number of random numbers be n, the maximum value t can assume is n−1. When the total number of t's passing the test is $\chi^2$(n−1, 0.05) or more, therefore, it is judged that the test is passed.

However, this is nothing but an example. How to set a critical rate for the $\chi^2$-distribution is entrusted to the user's decision and it is not fixed. As a matter of course, however, the less the ratio of the rejected test results to the tested number becomes, the better. In the test method in the above-described document (Solomon W. Golomb, SHIFT REGISTER SEQUENCES), the test is passed on condition that test is passed at every distance t between two random numbers in a random number series having a total of n random numbers.

As a result, a circuit portion required for the process of transform from the serial random numbers to parallel random numbers and its inverse transform can be removed. Thus, a small-sized circuit in which the circuit scale does not depend upon the total number n of random numbers required for the test is implemented. Its concrete examples will be described with reference to embodiments.

Validity of conducting the test by using the total sum represented by the expression (3) could be exhibited. A random number test circuit using the above-described test method and test criterion with respect to the auto-correlation function C(t) in which the expression (3) is adopted will be described with reference to first to ninth embodiments.

Hereafter, embodiments of the present invention will be described with reference to the drawings. In the drawings, the same or similar parts are denoted by the same or similar characters.

First to third embodiments of the present invention are random number test circuits following the decision criterion based on the equations (1) and (8) which adopts the random number test method. The random number test circuits use a random number test method of verifying the uniformity of random numbers by conducting frequency counting of appearance of equality between the random number $S_i$ and the random number $S_{i+1}$ in the expression (1) and comparing the count with a prescribed value.

First Embodiment

A random number test circuit according to a first embodiment of the present invention is shown in FIG. 1. The random number test circuit in the present embodiment includes a shift register 1, AND gates 2, 3 and 4, an OR gate 5, an XNOR (exclusive NOR) gate 6, a counter circuit 7, a comparison circuit 8, a counter circuit 9, a comparison circuit 10, and a control circuit 50. By the way, the number of the AND gates is changed according to t described with reference to the test criterion.

A random signal $RS_i$ representing serial random numbers generated by a random number generation element is input to an input terminal 101 of the random number test circuit. As a result, the random signal $RS_i$ and a random signal $RS_{i+t}$ obtained by delaying the random signal $RS_i$ by a certain number t of clock pulses are input to the XNOR gate 6. If the random signal $RS_i$ is equal to the random signal $RS_{i+t}$ at some time, the XNOR gate 6 outputs "1." At this time, the random signal $RS_{i+t}$ is generated by the shift register 1. The number of stages in the shift register is determined according to t. In the case where test is conducted with respect to a plurality of t's (in the case where t=1, 3 and 4 in FIG. 1), a shift register 1 having $t_{max}$ stages ($t_{max}$=4 in FIG. 1) is prepared, where $t_{max}$ is maximum t among the t's. Random signals $RS_{i+t}$ are output from stages corresponding to respective t's to obtain a first input of the XNOR gate 6.

The number d of selected t's is in the range $1 \leq d \leq n-1$. Outputs of the shift register 1 corresponding to respective t's are connected to first inputs of the two-input AND gates 2, 3 and 4, respectively. Signals ON1, ON2 and ON3 supplied via output terminals 103, 104 and 105 of the control circuit 50 are connected to second inputs of the AND gates 2, 3 and 4, respectively. Outputs of these AND gates 2, 3 and 4 are input to the three-input OR gate 5. As a result, the random signals $RS_{i+t}$ having different values of t become the output value of the OR gate 5, i.e., the first input of the XNOR gate 6, in order according to time. However, the number of the AND gates and the number of input terminals of the OR gate become equal to the number of t's used for the test.

Figure 2:
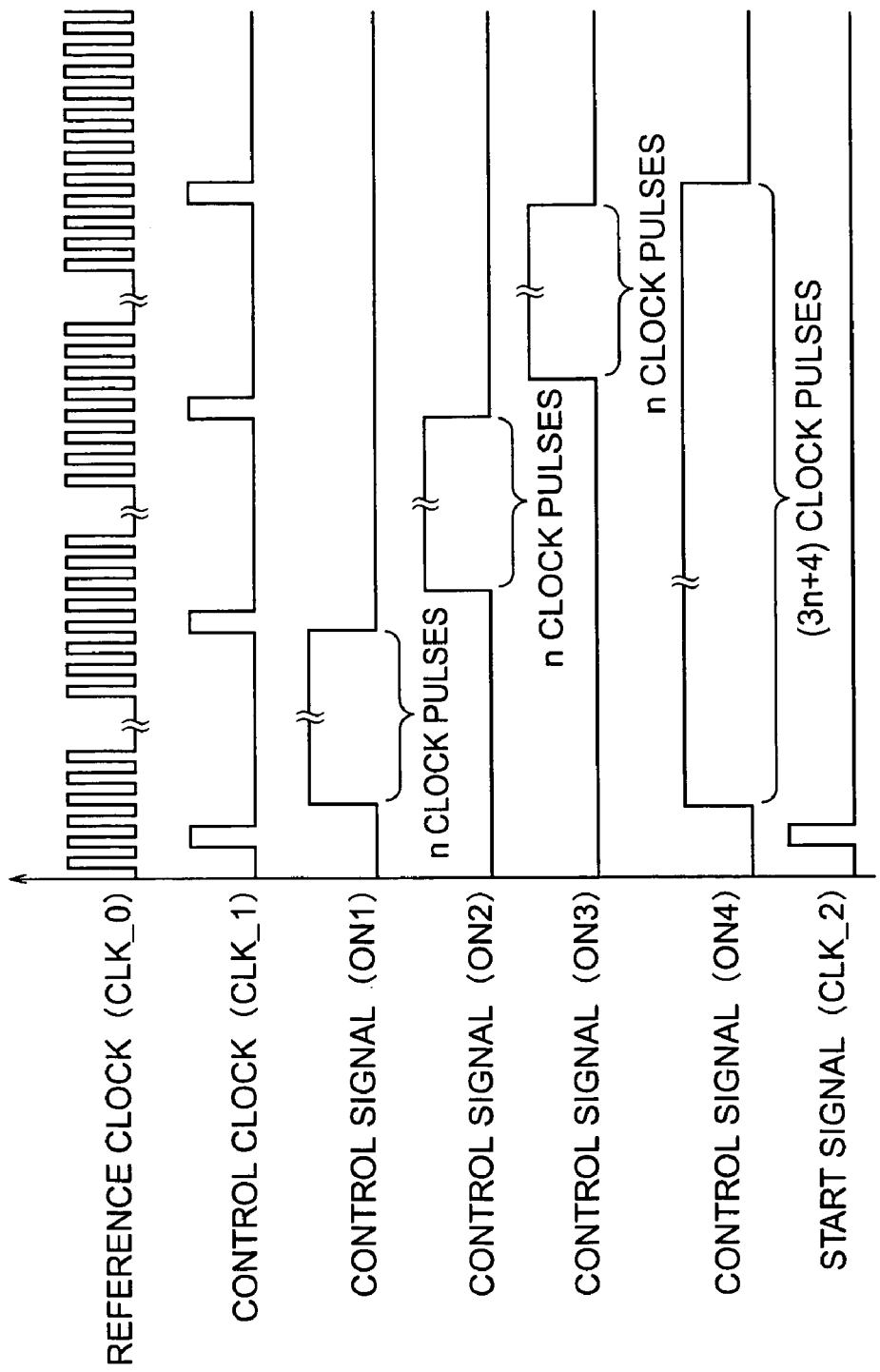
FIG. 2 is an operation timing chart of the random number test circuit according to the first embodiment.

A timing chart of operation of the random number test circuit according to the first embodiment of the present invention is shown in FIG. 2. When one of the control signals ON1, ON2 and ON3 is "1," two other signals are necessarily "0" as shown in the timing chart in FIG. 2. Each of the control signals remains to be "1" over n (where n is the total number of random numbers) clock pulses. The order of changing to "1" among the control signals ON1, ON2 and ON3 is arbitrary.

The counter circuit 7, which has a clock enable input CE to receive the output of the XNOR gate 6 and a clock input C to receive a reference clock CLK_0 from an input terminal 102, counts a value "1" of a signal input to the clock enable input CE every timing of the reference clock CLK_0 and outputs the count value. The counter circuit 7 is reset by a reset signal CLK_1 supplied from an output terminal 106 of the control circuit 50 every (n+1) clock pulses, where n is the total number of random numbers used for the test.

A count value A in the counter circuit 7 is compared in the comparison circuit 8 with a predetermined reference value. If the count value A in the counter circuit 7 is outside a range of the predetermined reference value, the comparison circuit 8 certainly outputs "1" between clock pulses since the counter circuit 7 is reset until the counter circuit 7 is reset subsequently.

Also when the control signal ON2 or the control signal ON3 is "1," the comparison circuit 8 compares the count value A in the counter circuit 7 with the predetermined reference value in the same way as when the control signal ON1 is "1." An output of the comparison circuit 8 is input to a clock input C of the counter circuit 9. A signal ON4 supplied via an output terminal 108 of the control circuit 50 is input to a clock enable input CE of the counter circuit 9. The comparison circuit 10 compares an output Q of the counter circuit 9 with a predetermined reference value and outputs a decision signal from an output terminal 109. As a result, predetermined random numbers which number n in all can be verified (dn+ 2d +1) clock pulses after a start signal CLK_2, where d is the number of selected t's and it is an arbitrary number. For example, in the random number test circuit according to the first embodiment shown in FIG. 1, d is d=3.

In the conventional art, it is necessary to hold the whole and a part of the random number series in order to compare two random numbers included in the random number series periodically.

In the present embodiment, however, comparison is not conducted periodically. The holding circuit needed to compare two random numbers with each other can be removed by considering that results of comparison between a certain random number $S_i$ and a random number ($S_{i+1}$ or $S_{i-1}$) located at a distance of certain number of clock pulses (which is now supposed to be t clock pulses) in time series from $S_i$ are equivalent as the random numbers becomes more similar to genuine random numbers. Irrespective of the number of data required for the test, expansion of the circuit scale can be prevented and the size can be made smaller.

Second Embodiment

Figure 3:
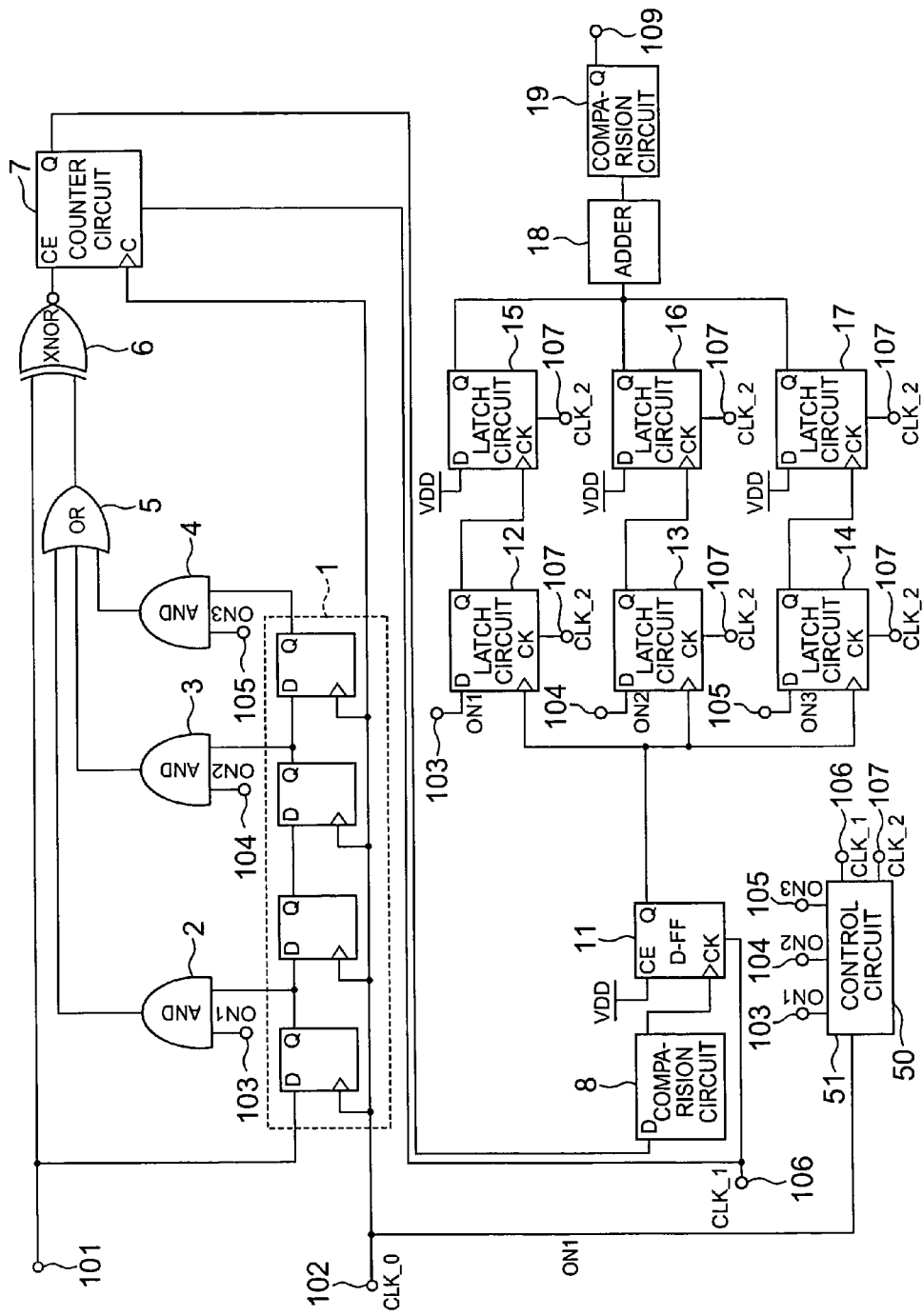
FIG. 3 is a diagram showing a random number test circuit according to a second embodiment of the present invention.
Figure 4:
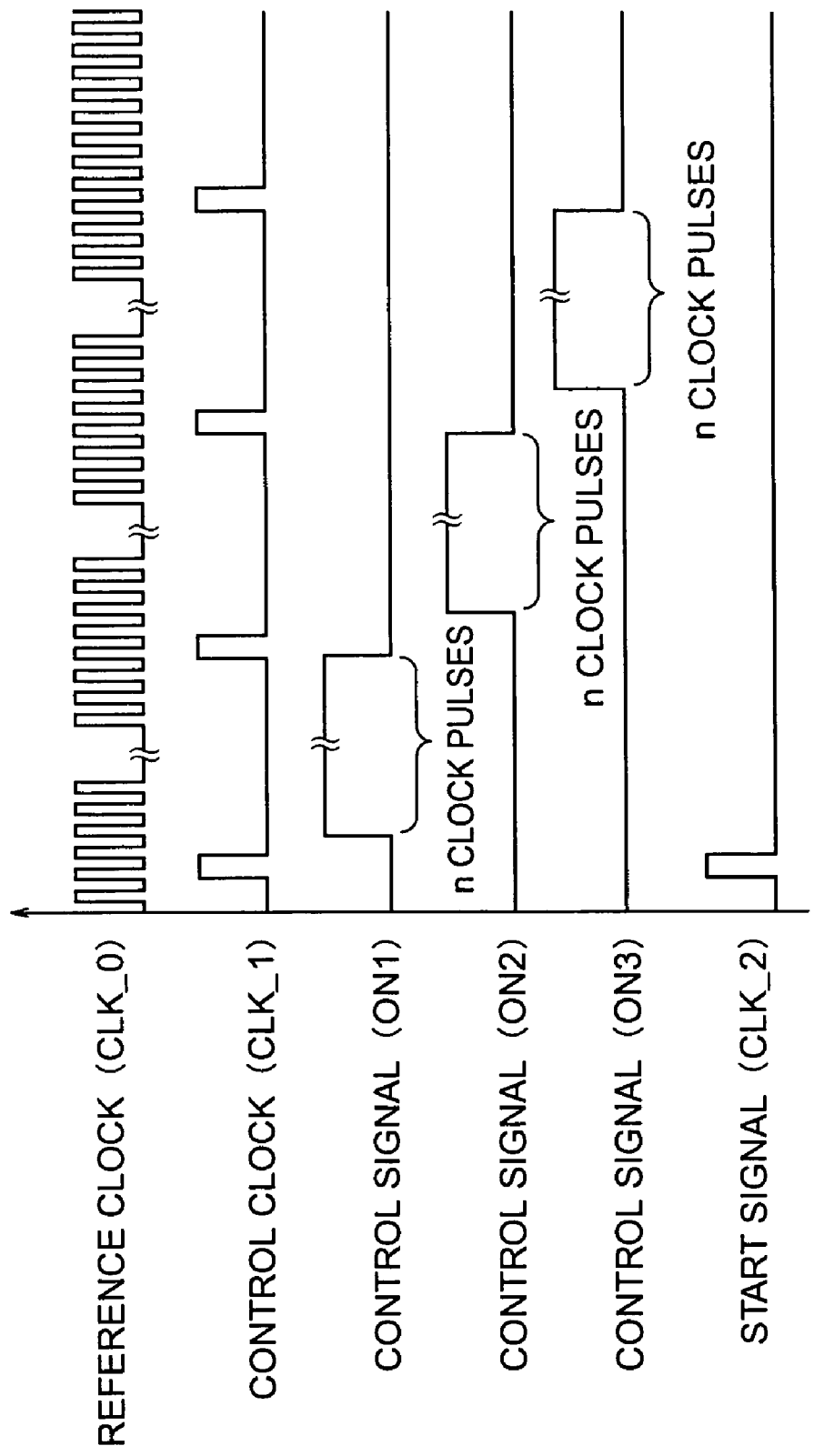
FIG. 4 is an operation timing chart of the random number test circuit according to the second embodiment.

A random number test circuit according to a second embodiment of the present invention is shown in FIG. 3. A timing chart of operation in the random number test circuit according to the present embodiment is shown in FIG. 4. In the random number test circuit in the present embodiment, the counter circuit 9 and the comparison circuit 10 in the random number test circuit according to the first embodiment are replaced by a D-type flip-flop circuit 11 (hereafter referred to also as D-FF 11), latch circuits 12, 13, 14, 15, 16 and 17, an adder 18, and a comparison circuit 19. The circuit shown in FIG. 3 is used when three t's are selected. The shift register 1, the AND gates 2, 3 and 4, the OR gate 5, the XNOR gate 6, and the counter circuit 7 operate in the same way as the first embodiment.

The count A in the counter circuit 7 is compared in the comparison circuit 8 with a predetermined reference value. A result of the comparison is held by the D-FF 11 until a signal of "1" is input from a CLK_1.

An output Q of the D-FF 11 is connected to clock inputs CK of the latch circuits 12 to 14. When the signals ON1 to ON3 generated by the control circuit 50 are "1," a result of comparison conducted by the comparison circuit 8 is temporarily held in the latch circuits 12 to 14 by rising edges of the clock inputs CK of the latch circuits 12 to 14. If the count value A in the counter circuit 7 is outside a range of the predetermined reference value, the comparison circuit 8 certainly outputs "1" between clock pulses since the counter circuit 7 is reset until the counter circuit 7 is reset subsequently.

Outputs of the latch circuits 12 to 14 are connected to clock inputs CK of the latch circuits 15 to 17, respectively. The latch circuits 15 to 17 hold the result of the comparison conducted by the comparison circuit until a signal CLK_2 generated by the control circuit 50 resets it.

Outputs of the latch circuits 15 to 17 are connected to an input of the adder 18. The adder 18 outputs the number of t's which are included in a plurality of predetermined distances t's between two random numbers and in which the autocorrelation function is judged to be outside of the normal distribution range. The comparison circuit 19 makes a decision whether the value output from the adder 18 is within a predetermined decision reference value or outside the reference value, and outputs a decision signal. As a result, a total of n predetermined random numbers can be verified (dn+2d+1) clock pulses after a start signal CLK_2. (Here, d is the number of selected t's. For example, in the second embodiment shown in FIG. 3, d=3.)

In the present embodiment as well, the holding circuit needed to compare two random numbers with each other can be removed in the same way as the first embodiment as heretofore described. Irrespective of the number of data required for the test, expansion of the circuit scale can be prevented and the size can be made smaller.

Third Embodiment

Figure 5A:
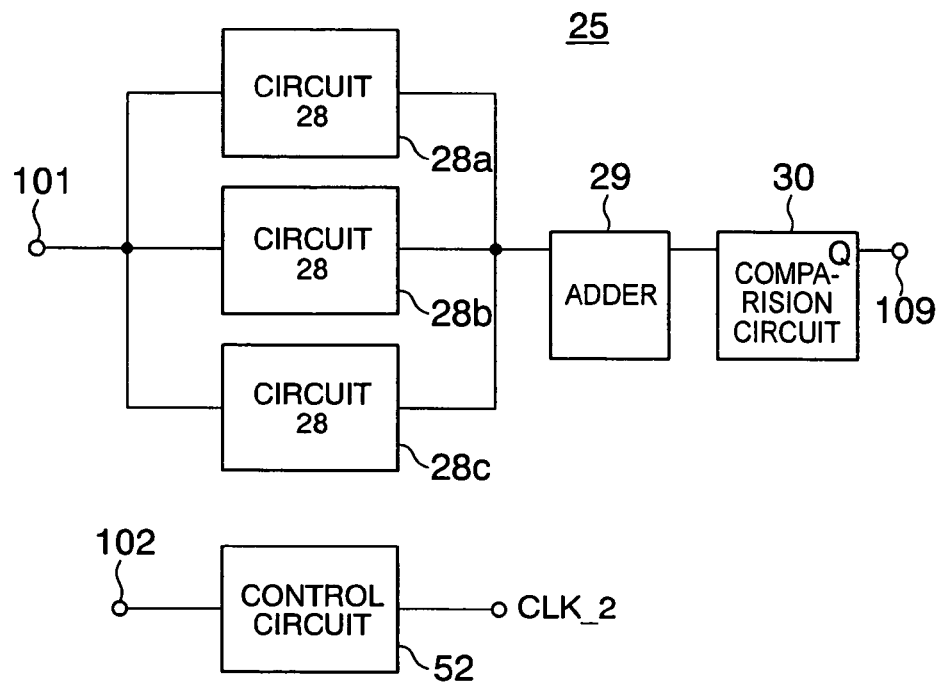
FIGS. 5A and 5B are diagrams showing random number test circuits according to a third embodiment of the present invention.
Figure 5B:
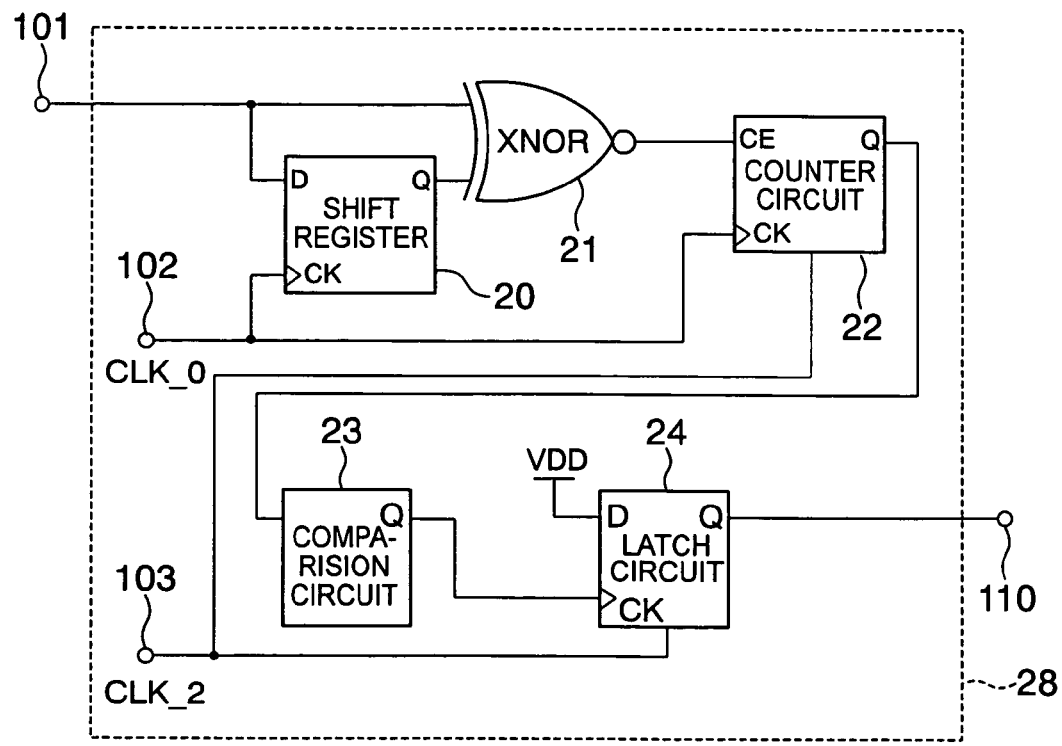
Figure 6:
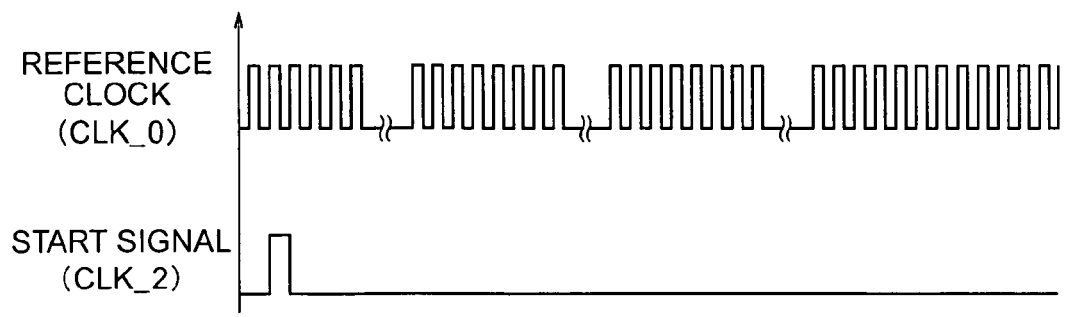
FIG. 6 is an operation timing chart of the random number test circuit according to the third embodiment.

A random number test circuit according to a third embodiment of the present invention is shown in FIGS. 5A and 5B. A timing chart of operation in the random number test circuit according to the present embodiment is shown in FIG. 6.

As shown in FIG. 5A, the random number test circuit in the present embodiment includes a circuit 25 including circuits 28a, 28b and 28c connected in parallel, an adder 29, a comparison circuit 30 and a control circuit 52. Each of the circuits 28a, 28b and 28c connected in parallel has the same configuration as a circuit 28 shown in FIG. 5B except only the number of stages in the shift register. The circuit shown in FIG. 5A is used when three t's are selected. The number of circuits connected in parallel is equal to the number of selected t's. The circuit 28 shown in FIG. 5B includes a shift register 20, an XNOR gate 21, a counter circuit 22, a comparison circuit 23, and a latch circuit 24.

In the circuit 28, a random signal $RS_i$ formed of serial random numbers generated by a random number generation element is input to a terminal 101 serving as a circuit input unit. As a result, the random signal $RS_i$ and a random signal $RS_{i+t}$ which is a certain number of clock pulses behind the random signal $RS_i$ and which is obtained by passing the random signal $RS_i$ through the shift register 20 are input to the XNOR gate 21. When the random signal $RS_i$ is equal to the random signal $RS_{i+t}$, the XNOR gate 21 outputs "1." The number of stages in the shift register corresponds to t in the expression (1) and it is set beforehand.

The counter circuit 22 receives the output of the XNOR gate 21 at its clock enable input CE, and receives a reference clock CLK_0 at its clock input CK via an input terminal 102. As a result, the counter circuit 22 counts the value "1" in the output signal of the XNOR gate 21 every timing of the clock signal CLK_0 and outputs its count value.

The comparison circuit 23 compares the count value A output from the counter circuit 22 with a predetermined reference value. An output signal of the comparison circuit 23 is input to a clock input CK of the latch circuit 24. By always applying "1" to a data input D of the latch circuit 24, the latch circuit 24 latches a result of the comparison with the reference value obtained from the comparison circuit 23. A falling edge of a start signal CLK_2 supplied via an input terminal 103 is used as a first clock pulse. If the output signal of the comparison circuit 23 becomes "1" during the time period ranging from the first to nth clock pulse, then it is judged that the count value A obtained by the counter circuit 22 is outside the range of the predetermined reference value.

The circuits 28a, 28b and 28c respectively having shift registers 20 which are different in the number of stages are connected in parallel as shown in FIG. 5A. As a result, tests with a plurality of different t's are executed in the circuits 28a, 28b and 28c. Outputs of the circuits 28a, 28b and 28c are input to the adder 29 and added up. A result of the addition is input to the comparison circuit 30. The comparison circuit 30 compares an output value output from the adder 29 with a value corresponding to the predetermined reference, and outputs a decision signal. As a result, a total of n predetermined random numbers can be verified n clock pulses after a start signal CLK_2.

In the present embodiment as well, the holding circuit needed to compare two random numbers with each other can be removed in the same way as the first embodiment as heretofore described. Irrespective of the number of data required for the test, expansion of the circuit scale can be prevented and the size can be made smaller.

The random number test circuits according to fourth to sixth embodiments of the present invention described hereafter are random number test circuits according to the decision criterion based on the expressions (1) and (9). The random number test circuits are formed so as to verify the uniformity of random numbers by conducting frequency counting of appearance of inequality between $S_i$ and $S_{i+t}$ in the expression (1) and comparing the appearance frequency with a prescribed value.

Fourth Embodiment

Figure 7A:
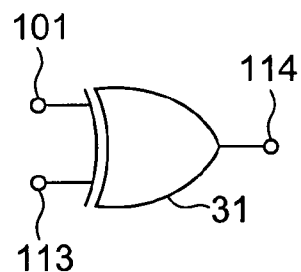
FIGS. 7A and 7B are diagrams showing gate circuits used in the random number test circuit according to fourth to ninth embodiments of the present invention.

A random number test circuit according to a fourth embodiment of the present invention will now be described. The random number test circuit according to the present embodiment has a configuration in which the XNOR gate 6 included in the random number test circuit according to the first embodiment shown in FIG. 1 is replaced by an XOR gate 31 shown in FIG. 7A.

Thus, the XNOR gate 6 is replaced by the XOR gate 31. As a result, the random signal $RS_i$ which is the input signal and the random signal $RS_{i+t}$ which is a certain number of clock pulses behind the random signal $RS_i$ and which is obtained by passing the random signal $RS_i$ through the shift register 1 are input to the XOR gate 31. When the random signal $RS_i$ is different from the random signal $RS_{i+t}$, therefore, the XOR gate 31 outputs "1." The counter circuit 7 counts the number of sets in which $RS_i$ is different from $RS_{i+t}$, from among n sets each having $RS_i$ and $RS_{i+t}$. The circuit operation described heretofore is basically the same as operation in the first embodiment.

In the present embodiment, the comparison circuit 8 compares a count value B in the counter circuit 7 with a predetermined reference value. Except that the values compared in the comparison circuit 8 are different, therefore, test can be conducted by operation which is basically the same as that in the first embodiment.

In the present embodiment as well, the holding circuit needed to compare two random numbers with each other can be removed in the same way as the first embodiment as heretofore described. Irrespective of the number of data required for the test, expansion of the circuit scale can be prevented and the size can be made smaller.

Fifth Embodiment

A random number test circuit according to a fifth embodiment of the present invention will now be described. The random number test circuit according to the present embodiment has a configuration in which the XNOR gate 6 included in the random number test circuit according to the second embodiment shown in FIG. 3 is replaced by the XOR gate 31 shown in FIG. 7A.

In the present embodiment as well, the comparison circuit 8 compares the count value B in the counter circuit 71 with a predetermined reference value. Except that the values compared in the comparison circuit 8 are different, therefore, test can be conducted by operation which is basically the same as that in the second embodiment.

In the present embodiment as well, therefore, the holding circuit needed to compare two random numbers with each other can be removed in the same way as the second embodiment as heretofore described. Irrespective of the number of data required for the test, expansion of the circuit scale can be prevented and the size can be made smaller.

Sixth Embodiment

A random number test circuit according to a sixth embodiment of the present invention will now be described. The random number test circuit according to the present embodiment has a configuration in which the XNOR gate 21 included in the random number test circuit according to the third embodiment shown in FIGS. 5A and 5B is replaced by the XOR gate 31 shown in FIG. 7A.

In the sixth embodiment, the comparison circuit 23 compares the count value B in the counter circuit 22 with a predetermined reference value. Except that the values compared in the comparison circuit 23 are different, therefore, test can be conducted by operation which is basically the same as that in the third embodiment.

In the present embodiment as well, therefore, the holding circuit needed to compare two random numbers with each other can be removed in the same way as the second embodiment as heretofore described. Irrespective of the number of data required for the test, expansion of the circuit scale can be prevented and the size can be made smaller.

Seventh to Ninth Embodiments

The random number test circuits according to seventh to ninth embodiments of the present invention described hereafter are random number test circuits according to the decision criterion based on the expressions (1) and (10). The random number test circuits are formed so as to verify the uniformity of random numbers by conducting frequency counting of appearance of $S_i$ and $S_{i+t}$ in the expression (1) being respectively "1" and "0" and comparing the appearance frequency with a prescribed value.

Seventh Embodiment

Figure 7B:
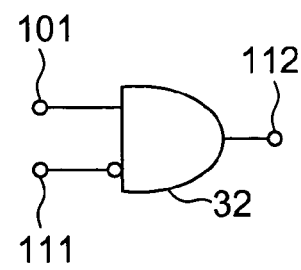

A random number test circuit according to a seventh embodiment of the present invention will now be described. The random number test circuit according to the present embodiment has a configuration in which the XNOR gate 6 included in the random number test circuit according to the first embodiment shown in FIG. 1 is replaced by a two-input AND gate 32 having a NOT input as one of its inputs as shown in FIG. 7B.

In the seventh embodiment, the comparison circuit 8 compares a count value X in the counter circuit 7 with a predetermined reference value. Except that the values compared in the comparison circuit 8 are different, test can be conducted by operation which is basically the same as that in the first embodiment.

In the present embodiment as well, therefore, the holding circuit needed to compare two random numbers with each other can be removed in the same way as the first embodiment as heretofore described. Irrespective of the number of data required for the test, expansion of the circuit scale can be prevented and the size can be made smaller.

Eighth Embodiment

A random number test circuit according to an eighth embodiment of the present invention will now be described. The random number test circuit according to the present embodiment has a configuration in which the XNOR gate 6 included in the random number test circuit according to the second embodiment shown in FIG. 3 is replaced by the two-input AND gate 32 having a NOT input as one of its inputs as shown in FIG. 7B.

In the eighth embodiment, the comparison circuit 8 compares the count value X in the counter circuit 7 with a predetermined reference value. Except that the values compared in the comparison circuit 8 are different, therefore, test can be conducted by operation which is basically the same as that in the second embodiment.

In the present embodiment as well, therefore, the holding circuit needed to compare two random numbers with each other can be removed in the same way as the second embodiment as heretofore described. Irrespective of the number of data required for the test, expansion of the circuit scale can be prevented and the size can be made smaller.

Ninth Embodiment

A random number test circuit according to a ninth embodiment of the present invention will now be described. The random number test circuit according to the present embodiment has a configuration in which the XNOR gate 21 included in the random number test circuit according to the third embodiment shown in FIGS. 5A and 5B is replaced by the two-input AND gate 32 having a NOT input as one of its inputs as shown in FIG. 7B. In the ninth embodiment, the comparison circuit 23 compares the count value X in the counter circuit 22 with a predetermined reference value. Except that the values compared in the comparison circuit 23 are different, therefore, test can be conducted by operation which is basically the same as that in the third embodiment.

In the present embodiment as well, therefore, the holding circuit needed to compare two random numbers with each other can be removed in the same way as the second embodiment as heretofore described. Irrespective of the number of data required for the test, expansion of the circuit scale can be prevented and the size can be made smaller.

By the way, the random number test circuits according to the first to ninth embodiments may be incorporated into a semiconductor chip having a random number generation element formed therein to generate random numbers, or may be incorporated into a different semiconductor chip.

In the random number test circuits according to the first to ninth embodiments already described, the comparison circuit 8 and the comparison circuit 23 have a circuit configuration which outputs "1" when the count value is outside the reference range. Alternatively, the comparison circuit 8 and the comparison circuit 23 may have a circuit configuration which outputs "1" when the count value is inside the reference range. In the random number test circuits according to the second, third, fifth, sixth, eighth and ninth embodiments already described, it becomes possible to form a circuit configuration which outputs "1" when the count value is in the range, by changing the output of each of the latch circuits 15 to 17 and 24 from Q to Q bar.

In the random number test circuits according to the first to ninth embodiments already described, the random number test is conducted on a certain 1-bit random number included in a random number series and a random number located at a distance t from the 1-bit random number. In addition, tests in the relation between the ratio of the number of t's subjected to test to the number of passing and the random number series are combined. If passing is recognized only in the case where passing is achieved at all t's, however, the portion including the adder 18 and the comparison circuit 19 or the portion including the adder 29 and the comparison circuit 30 in the random number test circuits according to the second, third, fifth, sixth, eighth and ninth embodiments can be replaced by a NOR circuit or an AND circuit.

According to the embodiments of the present invention, it is made possible to provide a random number test circuit which is not restricted in the total number of random numbers required for test, which does not increase in circuit scale even if a large number of data required for the test are handled, and which can be made small in size.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A random number test circuit comprising:
    a shift register which operates based on a clock and which successively stores serial random numbers generated by a random number generation element, wherein a first random number being output from a predetermined stage of the shift register;
    a comparison circuit which compares the first random number with a second random number located at a distance of a first predetermined number of bits from the first random number, the second random number being generated by the random number generation element;
    a counter which counts a frequency of occurrence of equality between the first random number and the second random number, with respect to all bits in the serial random numbers; and
    a decision circuit which judges an article quality to be good if a count value x in the counter satisfies $$\frac{n(\alpha - \delta + 1)}{2} < x < \frac{n(\alpha + \delta + 1)}{2},$$

wherein n represents a number of the bits in the serial random numbers, and $\alpha$ and $\delta$ satisfy $$\alpha = -\frac{1}{n-1} \text{ and } \delta = \frac{2}{n-1}\sqrt{\frac{n(n-3)}{n+1}},$$

respectively.

2. The test circuit according to claim 1, wherein
    a number of sample data in the serial random number is arbitrary, and
    the random number test circuit uses a random number test method in which a criterion used in the decision circuit to judge a quality of an article to be good follows normal distribution according to a total number of random numbers to be subjected to test.

3. The test circuit according to claim 1, wherein the random number test circuit is incorporated into the same semiconductor chip as that into which the random number generation element is incorporated.

4. A random number test circuit comprising:
    a shift register which operates based on a clock and which successively stores serial random numbers generated by a random number generation element, wherein a first random number being output from a predetermined stage of the shift register;
    a comparison circuit which compares the first random number with a second random number located at a distance of a first predetermined number of bits from the first random number, the second random number being generated by the random number generation element;
    a counter which counts a frequency of occurrence of inequality between the first random number and the second random number, with respect to all bits in the serial random numbers; and
    a decision circuit which judges an article quality to be good if a count value y in the counter satisfies $$\frac{n(1 - \alpha - \delta)}{2} < y < \frac{n(1 - \alpha + \delta)}{2},$$

wherein n represents a number of the bits in the serial random numbers, and $\alpha$ and $\delta$ satisfy $$\alpha = -\frac{1}{n-1} \text{ and } \delta = \frac{2}{n-1}\sqrt{\frac{n(n-3)}{n+1}},$$

respectively.

5. The test circuit according to claim 4, wherein
    a number of sample data in the serial random number is arbitrary, and
    the random number test circuit uses a random number test method in which a criterion used in the decision circuit to judge a quality of an article to be good follows normal distribution according to a total number of random numbers to be subjected to test.

6. The test circuit according to claim 4, wherein the random number test circuit is incorporated into the same semiconductor chip as that into which the random number generation element is incorporated.

7. The random number test circuit according to claim 1, wherein:
    the shift register outputs a plurality of first random numbers from a plurality of predetermined stages of the shift register;
    the comparison circuit compares the first random numbers with second random numbers respectively located at distances of predetermined number of bits from the first random numbers, the second random numbers being generated by the random number generation element; and
    the counter counts a frequency of occurrence of equality between each of the first random numbers and each of the second random numbers, for each of the first random numbers with respect to all bits in the serial random numbers.

8. The test circuit according to claim 7, wherein
    a number of sample data in the serial random number is arbitrary, and the random number test circuit uses a random number test method in which a criterion used in the decision circuit to judge a quality of an article to be good follows normal distribution according to a total number of random numbers to be subjected to test.

9. The test circuit according to claim 7, wherein the random number test circuit is incorporated into the same semiconductor chip as that into which the random number generation element is incorporated.

10. The random number test circuit comprising according to claim 4, wherein:
the shift register outputs a plurality of first random numbers from a plurality of predetermined stages of the shift register;
the comparison circuit compares the first random numbers with second random numbers respectively located at distances of predetermined number of bits from the first random numbers, the second random numbers being generated by the random number generation element; and
the counter counts a frequency of occurrence of inequality between each of the first random numbers and each of the second random numbers, for each of the first random numbers with respect to all bits in the serial random numbers.

11. The test circuit according to claim 10, wherein
a number of sample data in the serial random number is arbitrary, and
the random number test circuit uses a random number test method in which a criterion used in the decision circuit to judge a quality of an article to be good follows normal distribution according to a total number of random numbers to be subjected to test.

12. The test circuit according to claim 10, wherein the random number test circuit is incorporated into the same semiconductor chip as that into which the random number generation element is incorporated.

* * * * *